United States Patent
McAuliffe et al.

(10) Patent No.: US 8,679,210 B2
(45) Date of Patent: Mar. 25, 2014

(54) SHROUDED PARTICLE SEPARATOR

(75) Inventors: Christopher McAuliffe, Windsor, CT (US); Brent J. Merritt, Southwick, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1 day.

(21) Appl. No.: 13/351,610

(22) Filed: Jan. 17, 2012

(65) Prior Publication Data

US 2013/0180220 A1 Jul. 18, 2013

(51) Int. Cl.
*B01D 45/12* (2006.01)

(52) U.S. Cl.
USPC ............ 55/306; 55/396; 55/398; 55/441; 55/442; 55/445; 244/538

(58) Field of Classification Search
USPC ............ 55/306, 307, 396, 397, 440, 441; 96/267; 60/39.092; 244/53 B; 415/121.2; 123/41.64
See application file for complete search history.

(56) References Cited

U.S. PATENT DOCUMENTS

| | | | | |
|---|---|---|---|---|
| 2,401,584 A | * | 6/1946 | Rhines | 123/41.64 |
| 3,041,827 A | * | 7/1962 | Ferri | 138/40 |
| 3,148,043 A | * | 9/1964 | Richardson et al. | 55/306 |
| 3,616,616 A | * | 11/1971 | Flatt | 55/306 |
| 3,825,212 A | | 7/1974 | Darges et al. | |
| 3,979,903 A | * | 9/1976 | Hull et al. | 60/39.092 |
| 4,389,227 A | * | 6/1983 | Hobbs | 55/306 |
| 4,493,185 A | * | 1/1985 | Hobbs | 60/39.092 |
| 5,139,545 A | | 8/1992 | Mann | |
| 6,276,632 B1 | * | 8/2001 | Sanders et al. | 244/53 B |
| 6,705,569 B1 | * | 3/2004 | Sanders et al. | 244/53 B |
| 7,328,771 B2 | * | 2/2008 | Costa et al. | 181/214 |
| 7,342,332 B2 | | 3/2008 | McAuliffe et al. | |
| 7,394,175 B2 | | 7/2008 | McAuliffe et al. | |
| 7,608,122 B2 | * | 10/2009 | Snyder | 55/306 |
| 7,658,061 B2 | * | 2/2010 | Kawamoto et al. | 60/39.092 |
| 7,757,502 B2 | | 7/2010 | Merritt et al. | |
| 7,779,644 B2 | | 8/2010 | Decrisantis et al. | |
| 7,866,600 B2 | * | 1/2011 | Barnard et al. | 244/53 B |

(Continued)

FOREIGN PATENT DOCUMENTS

| | | |
|---|---|---|
| FR | 2642662 A1 | 8/1990 |
| JP | S60144924 A | 7/1985 |
| JP | 2008514179 A | 5/2008 |

OTHER PUBLICATIONS

Extended European Search Report from EP Application Serial No. 12198669.9, dated Mar. 28, 2013, 8 pages.

(Continued)

*Primary Examiner* — Duane Smith
*Assistant Examiner* — Minh-Chau Pham
(74) *Attorney, Agent, or Firm* — Kinney & Lange, P.A.

(57) ABSTRACT

A particle separator includes a first housing and a second housing. The first housing extends along an axis from an open proximal end to an open distal end. The second housing has a closed proximal end disposed adjacent the open proximal end of the outer housing. The second housing extends from the closed proximal end into the first housing along substantially a same axis as the axis of the first housing. The second housing has one or more passages disposed at a distance from the closed proximal end of the second housing. Additionally, the one or more passages are disposed within the first housing at a distance from the open proximal end thereof.

20 Claims, 3 Drawing Sheets

(56) References Cited

U.S. PATENT DOCUMENTS

| | | | | |
|---|---|---|---|---|
| 8,419,815 | B1* | 4/2013 | Moran | 55/306 |
| 2003/0024232 | A1* | 2/2003 | Snyder et al. | 60/39.092 |
| 2003/0024233 | A1* | 2/2003 | Snyder | 60/39.092 |
| 2010/0236200 | A1* | 9/2010 | Saeed et al. | 55/306 |

OTHER PUBLICATIONS

Notice of Reason for Rejection from Japanese patent application Serial No. 2013-005032, dated Dec. 11, 2013, 4 pages.

* cited by examiner

SHROUDED PARTICLE SEPARATOR

BACKGROUND

The present invention relates to a particle separator. In particular, the invention relates to a shrouded particle separator for an environmental control system of an aircraft.

The environmental control system (ECS) aboard an aircraft provides conditioned air to an aircraft cabin. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a ram air fan within the ECS is employed to provide the necessary airflow across the ECS heat exchangers.

Typically, ram air fans utilize an electric motor to drive the fan. This is accomplished by a rotor assembly, which is driven by a stator. The stator generates a significant amount of heat as a byproduct of the magnetic field used to drive the rotor assembly. Additionally, bearings that support the rotor assembly typically produce heat, and therefore, require cooling. As a result of these sources of heat, the electric motor must be cooled by sources such as external air. Thus, air is provided to the stator and bearings of the ram air fan along one or more flow paths from upstream or downstream of the ram air fan in the ECS.

Due to the collection inlet(s) location in the ECS (and the aircraft) adjacent the ram air fan, the collection inlet(s) for cooling air are exposed to a high volume of particulate (such as dirt) during operation. Thus, it is desirable to employ one or more particle separators to collect cooling air for the stator and bearings in order to reduce the amount of particulate that reaches those components. Unfortunately, particle separators such as a reverse J-tube particle separator are ineffective at removing particulate from cooling air as reverse J-tubes require a high velocity clean airstream, which may not be available at the ram air fan and the area there around. As a result, particle separators such as the reverse J-tube are subject to problems such as clogging or operate in an undesirable manner by introducing particle laden cooling air to interior components of the ram air fan.

SUMMARY

A particle separator includes a first housing and a second housing. The first housing extends along an axis from an open proximal end to an open distal end. The second housing has a closed proximal end disposed adjacent the open proximal end of the outer housing. The second housing extends from the closed proximal end into the first housing along substantially a same axis as the axis of the first housing. The second housing has one or more passages disposed at a distance from the closed proximal end of the second housing. Additionally, the one or more passages are disposed within the first housing at a distance from the open proximal end thereof.

In another aspect, an assembly for cooling a ram air fan includes one or more components internal to the ram air fan that generate heat during operation and a shrouded particle separator. The shrouded particle separator is disposed in flow communication with the components of the ram air fan. The shrouded particle separator has a first housing with an open proximal end and a second housing. The second housing has a portion disposed within the first housing. The second housing has one or more passages therein. The passages are disposed within the first housing at a distance from the open proximal end thereof.

In yet another aspect, an environmental control system includes one or more components that generate heat during operation and a shrouded particle separator. The shrouded particle separator is disposed in flow communication with the components. The shrouded particle separator has a first housing with an open proximal end and a second housing. The second housing has a portion disposed within the first housing. The second housing has one or more passages therein. The passages are disposed within the first housing at a distance from the open proximal end thereof.

DETAILED DESCRIPTION

The present invention relates to a shrouded particle separator for an environmental control system (ECS), and in particular to a shrouded particle separator for use in cooling the motor stator and bearings of a ram air fan. The shrouded particle separator effectively separates particulates such as dirt from turbulent air flow passing adjacent the ram air fan and supplies a flow of substantially clean cooling air to a motor stator and journal bearings. In particular, an outer housing of the shrouded particle separator straightens the particle filled air flow relative to an exterior surface of an inner housing before the air flow passes to cooling passages in the inner housing. Upon reaching the cooling passages the relatively lighter particle free portion of air flow has sufficiently low momentum to turn substantially 90° relative to the exterior surface of the inner housing and enter the cooling passages. Larger particles have too large a momentum to turn from the straight flow path and enter the passages. The cooling passages are sized to operating conditions and application specific parameters to draw air therein while leaving particulate such as dirt to pass through the outer housing without entering the inner housing. Once in the inner housing, the clean air flow passes through several elbow turns inside the inner housing before connecting by a duct, hose, or similar passage to the ram air fan. In the ram air fan the clean cooling air flow is introduced by conventional means across the motor stator and the bearings. The shrouded particle separator is advantageous because the unit can be positioned in particle laden airflow in turbulent areas of ducting and is able to achieve separation of unwanted particles without experiencing negative side effects such as plugging or introducing particle laden air to undesirable locations.

Figure 1:
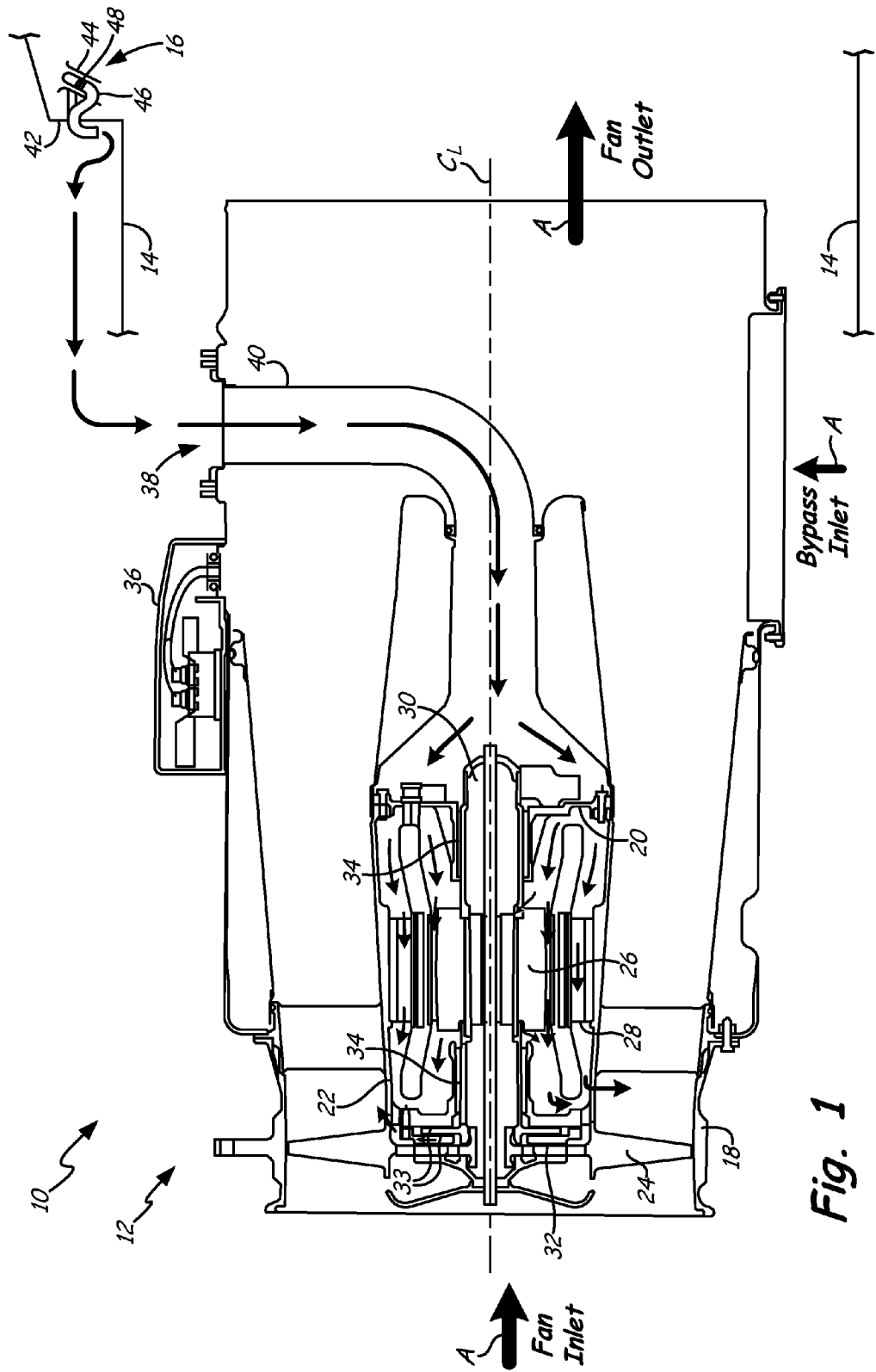
FIG. 1 is a cross-sectional view of a shrouded particle separator providing cooling air flow to a ram air fan.

FIG. 1 shows a portion of an environmental control unit (ECS) 10 which includes a ram air fan 12, a casing 14, and a shrouded particle separator 16. FIG. 1 shows a cross-section of ram air fan 12 including a fan outer housing 18, a bearing housing 20, an inner housing 22, a fan rotor 24, a motor rotor 26, a motor stator 28, a shaft 30, thrust plates 32, thrust bearings 33, journal bearings 34, a terminal box 36, a cooling inlet 38 and a cooling tube 40. Casing 14 includes a ram outlet header 42. Shrouded particle separator 16 includes an outer housing 44 and an inner housing 46. Inner housing 46 includes passages 48.

A fan inlet is a source of air flow to be moved by ram air fan 12 in the absence of sufficient ram air pressure. A bypass inlet is a source of air flow that moves through ram air fan 12 when sufficient ram air pressure is available. Air flow from bypass inlet or fan inlet exits the ram air fan 10 through fan outlet to casing 14.

As illustrated in FIG. 1, ram air fan 10 has a construction as described in U.S. Pat. Nos. 7,394,174 and 7,757,502, which are incorporated herein by reference. Therefore, the construction and operation of ram air fan 10 will not be described in great detail. Fan outer housing 18 surrounds and encompasses bearing housing 20 and inner housing 22. Fan outer housing 18 (including fan case) is attached to inner housing 22 at fan struts. Bearing housing 20 is attached to inner housing 22 with bolts. Fan rotor 24 extends radially with respect to centerline $C_L$ from shaft 30 to adjacent fan outer housing 18 forward of bearing housing 20 and inner housing 22. In particular, fan rotor 24 is attached to shaft 30 by conventional means such as a tie rod (not numbered).

Motor rotor 26 and motor stator 28 are disposed within bearing housing 20 and inner housing 22. In the embodiment shown, motor rotor 26 is contained within motor stator 28 and connects to shaft 30. Together motor rotor 28 and shaft 30 define an axis of rotation for ram air fan 10.

Thrust plate 32 and inner housing 22 contain a flange extension of shaft 30, with thrust bearings 33 positioned between the flange extension of shaft 30 and thrust plate 32; and between the flange-like portion of shaft 30 and inner housing 22. Journal bearings 34 are disposed aft of thrust plate 32 and thrust bearings 33 and are positioned between shaft 30 and bearing housing 20. Additionally, journal bearings 34 are disposed along aft portion of shaft 30.

Terminal box 36 is disposed in outer housing 18 and electronics such as wires are run to inner housing 22 by wire transfer tube (not shown). Outer housing 18 also contains cooling inlet 38 which communicates with inner housing 22 via cooling tube 40. As is illustrated in FIG. 1 with arrows, cooling air is separated by shrouded particle separator 16 and flows from shrouded particle separator 16 to inner housing 22 through inlet 38, tube 40 and additional ducts (not shown).

In the embodiment shown in FIG. 1, shrouded particle separator 16 is positioned downstream of ram air fan 10 (as defined by the direction of air flow) adjacent ram outlet header 42 portion of casing 14. The relative positioning of shrouded particle separator 16 relative to the direction of air flow and ram outlet header 42 is variable and is dictated by operational specific criteria such as volume and velocity of air flow, estimated particle content, operational speeds of ram air fan, altitude, etc. Commercially available computational fluid dynamics software is available to aid in optimizing criteria such as the geometry and positioning of shrouded particle separator 16 given operational criteria.

Shrouded particle separator 16 includes outer housing 44 that is shaped like a sleeve or tube and a bell-mouth proximal end. Inner housing 46 is disposed within outer housing 44. In the embodiment shown in FIG. 1, inner housing 46 is tube or conduit shaped and has a closed proximal end adjacent bell-mouth of outer housing 44. Passages 48 extend through inner housing 46 a distance from the proximal end of inner housing 46. As will be discussed subsequently, passages 48 are sized and positioned so as not to receive particles from air flow passing through outer housing 44 such that only substantially clean air flow enters inner housing 46 for cooling purposes.

In operation, ram air fan 12 is installed into ECS 10 aboard an aircraft and connected to the fan inlet, the bypass inlet, and the fan outlet. When the aircraft does not move fast enough to generate sufficient ram air pressure to meet the cooling needs of ECS 10, power is supplied to motor stator 28 to energize motor stator 28. This causes motor rotor 26 to rotate about the axis of rotation for ram air fan 12, rotating connected shaft 30 and fan rotor 24. Journal bearings 34 and thrust bearings 33 provide low friction support for the rotating components. As fan rotor 24 rotates, it moves air from the fan inlet, through fan outer housing 18 to fan outlet.

Components within bearing housing 20 and inner housing 22, including thrust bearings 33, journal bearings 34, motor stator 28, and motor rotor 26. These components generate significant heat and must be cooled during operation. As previously discussed and illustrated in FIG. 1, cooling air is provided to flow across thrust bearings 33, journal bearings 34, motor stator 28, and motor rotor 26 and accomplish cooling. In particular, cooling air flows from shrouded particle separator 16 to inner housing 22 through inlet 38, tube 40 and additional ducts or passages (not shown). Once the cooling air has passed across thrust bearings 33, journal bearings 34, motor stator 28, and motor rotor 26 the air flow exits inner housing 22 in a manner known in the art and further detailed in U.S. Pat. No. 7,342,332, which is incorporated herein by reference.

Figure 2A:
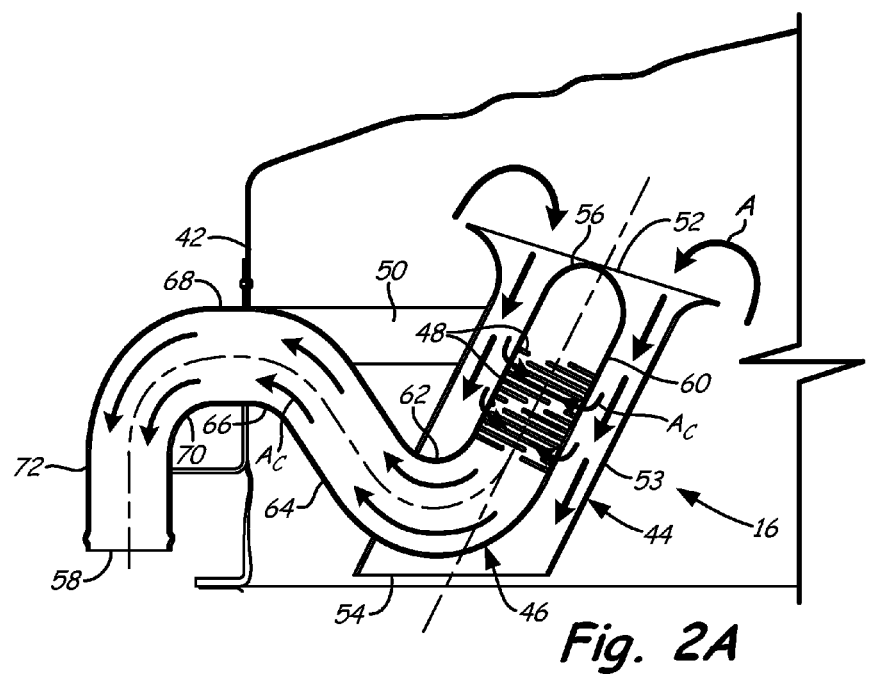
FIG. 2A is a cross-sectional view of the shrouded particle separator of FIG. 1.
Figure 2B:
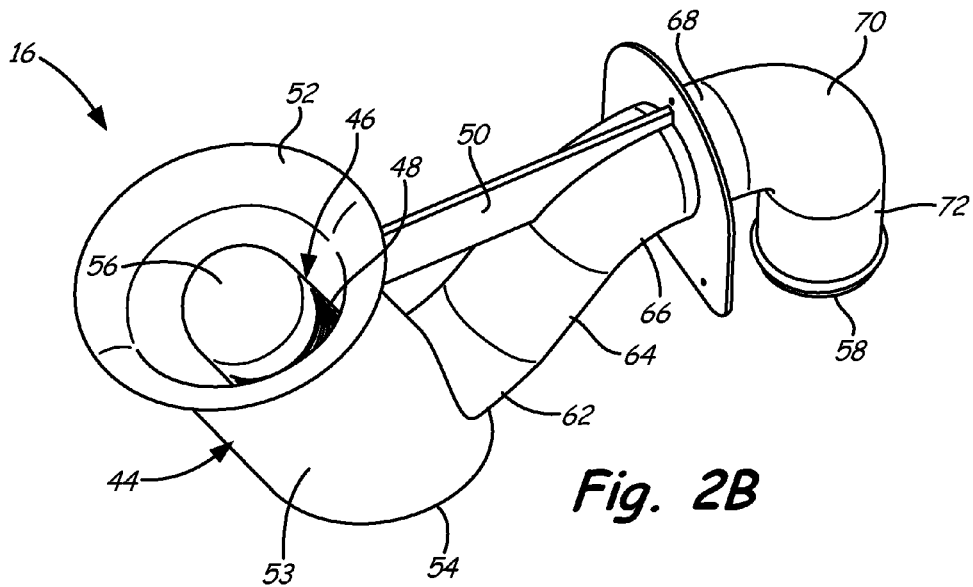
FIG. 2B is perspective view of the shrouded particle separator of FIG. 2A.

FIG. 2A shows a cross-section of shrouded particle separator 16. FIG. 2B shows a perspective view of shrouded particle separator 16. In addition to outer housing 44 and inner housing 46, shrouded particle separator 16 includes a support member 50. Outer housing 44 includes a proximal end 52 and a distal end 54. In addition to passages 48, inner housing 46 includes a proximal end 56, a distal end 58, a first portion 60, a first elbow 62, a second portion 64, a second elbow 66, a third portion 68, a third elbow 70, and a fourth portion 72.

Outer housing 44 and inner housing 46 are supported and mounted to ram outlet header 42 by support member 50, which is connected to both ram outlet header 42 and outer housing 44. In the embodiment shown in FIGS. 2A and 2B, outer housing 44 has a tubular shape and extends straight without turns/elbows from proximal end 52 to distal end 54. Proximal end 52 includes a bell-mouth. Outer housing 44 and inner housing 46 can be constructed from light-weight durable material such as sheet metal.

As shown in FIGS. 2A and 2B, inner housing 46 has a tubular construction and extends from proximal end 56 to distal end 58. Portions of inner housing 46 are disposed within outer housing 44 following along same axis of symmetry as that of outer housing 44. Thus, second inner housing 46 has a proximal first portion 60 that is coaxially positioned within first outer housing 44. In the embodiment shown, the portions disposed within outer housing 44 include capped proximal end 56, first portion 60, and passages 48. In other embodiments, portions of inner housing 46 such as proximal end 56 and first portion 60 may extend beyond proximal end 52 of outer housing 44.

Inner housing 46 comprises a hollow tube that extends from outer housing 44 near the distal end 54 thereof. Proximal end 56 has a closed semispherical or dome shaped end and transitions to straight first portion 60. Passages 48 extend through a side surface of first portion 60 and are thus recessed at a distance from proximal ends 52 and 56 of outer housing 44 and inner housing 46. Additionally, passages 48 are recessed from side wall 53 of outer housing 44. As will be discussed subsequently, passages 48 are offset from a direction of air flow passing through outer housing 44 and across the outer surface of first portion 60 such that air flow changes direction to enter inner housing 46 through passages 48. In one embodiment, passages 48 are disposed in inner housing 46 along a side surface of first portion 60 so as to be offset by substantially 90° with respect to air flow passing through the outer housing 44.

The distance passages can be recessed with respect to proximal ends 56 and/or 52 will vary from embodiment to embodiment and will be dependant upon operating conditions. As discussed subsequently, the location and geometry of shrouded particle separator 16 will vary and can be determined using computational fluid dynamics software. Thus, geometric design particulars such as the size, shape, and number of passages 48 will vary from embodiment to embodiment. In the embodiment shown, outer housing 44 has a diameter of about 4.0 inches (10.2 cm), inner housing has a diameter of about 2.0 inches (5.10 cm), passages 48 are between about 0.05 and 0.10 inches (0.1 and 0.2 cm) in width, and the recess distance of passages 48 from proximal end 52 is about 2.66 inches (6.8 cm).

First portion 60 has an axis of symmetry that substantially aligns with outer housing 44. Thus, side surface of first portion 60 extends substantially parallel to and is disposed at a distance from side wall 53 of outer housing 44. Straight first portion 60 transitions to straight second portion 64 through first elbow 62. First elbow 62 has a first radius. First radius may be the same as or differ from the radii of second and third elbows 66 and 70. First elbow 62 extends through outer housing 44 before connecting to second portion 64. Straight second portion 64 transitions to straight third portion 68 via second elbow 66. Third portion 68 passes through ram outlet header 42 and connects to fourth portion 72. Straight fourth portion 72 terminates at distal end 58 of inner housing 46.

As previously discussed distal end 58 can be connected by conventional means to a duct, tube, or similar passage (not shown), which directs clean cooling air $A_C$ to interior components of ram air fan 12 (FIG. 1).

In operation, shrouded particle separator 16 is disposed such that particle filled air flow A must turn to enter proximal end 52 of outer housing 44 as illustrated in FIG. 2A. The bell-mouth at proximal end 52 operates to help streamline turbulent flow and the design of outer housing 44, with straight radius free construction from proximal end 52 to distal end 54, has the effect of straightening the flow path of the entrained particulate passing through outer housing 44 relative to the exterior side surface of first portion 60 of inner housing 46 and interior of side wall 53 of outer housing 44. Upon reaching passages 48 the relatively lighter particle free portion of air flow has sufficiently low momentum to turn substantially 90° relative to exterior surface of first portion 60 and enter passages 48. Larger particles, for example particles of 0.2 mils (5 microns) or larger in one application, will have too large a momentum to turn from the straight flow path and enter passages 48. In this manner, shrouded particle separator 16 acts to separate particulate from air flow. Once separated and within interior of inner housing 46 the cooling air $A_C$ is transported there along and through suitable means back to ram air fan 12 or other portions of ECS 10.

Figure 3:
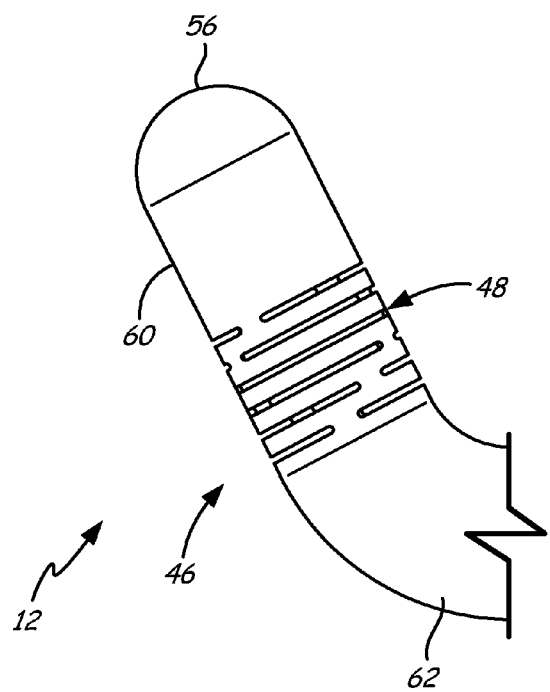
FIG. 3 is a side view of a proximal end of an inner housing of the shrouded particle separator showing a plurality of passages disposed therein.

FIG. 3 shows proximal end 56 and first portion 60 of inner housing 46. As shown in FIG. 3, proximal end 56 is closed. Passages 48 extend through first portion 60 and are disposed at a distance from proximal end 56. In the embodiment shown, passages 48 are slots that extend around a portion of the circumference of inner housing 46. These slots are offset from one another in a staggered pattern along first portion 60 such that each slot terminates in a different position along the circumference of first portion. As previously discussed the slots have a width of between about 0.05 and 0.10 inches (0.1 and 0.2 cm) in one embodiment.

While the invention has been described with reference to an exemplary embodiment(s), it will be understood by those skilled in the art that various changes may be made and equivalents may be substituted for elements thereof without departing from the scope of the invention. For example, the size, shape, and number of cooling passages 48 can be altered. The relative sizes and shapes of inner and outer housings 44 and 46 can be changed. Shrouded particle separator 16 could be used with other components of ECS 10 or with other systems of the aircraft. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A particle separator comprising:
    a first housing extending along an axis from an open proximal end to an open distal end; and
    a second housing extending into the first housing, wherein the second housing has a plurality of passages therein, the plurality of passages are disposed within the first housing at a distance from the open proximal end thereof.

2. The particle separator of claim 1, wherein the second housing has a closed proximal end disposed adjacent the open proximal end of the outer housing.

3. The particle separator of claim 1, wherein the open proximal end of the first housing includes a bell-mouth and the first housing has a hollow tubular shape.

4. The particle separator of claim 1, wherein the plurality of passages extend through a side surface of the second housing that is disposed within the first housing.

5. The particle separator of claim 4, wherein the plurality of passages are disposed substantially 90 degrees to a direction of an air flow passing through the first housing such that air flow must change flow direction to pass through the plurality of passages and enter the second housing.

6. The particle separator of claim 1, wherein the plurality of passages of comprise a plurality of slots disposed at a distance from one another along the second housing, each slot has a width of between about 0.05 and 0.10 inches (0.1 and 0.2 cm).

7. The particle separator of claim 6, wherein the slots are offset from one another such that each slot terminates in a different position along a circumference of the second housing.

8. The particle separator of claim 1, wherein a proximal portion of the second housing is coaxially positioned within the first housing.

9. The particle separator of claim 8, wherein a side surface of the second housing extends substantially parallel to a side wall of the first housing, and wherein the plurality of passages extend through the side surface of the second housing.

10. The particle separator of claim 9, wherein the second housing has at least one elbow portion and the second housing extends through the side wall of the first housing.

11. An assembly for cooling a ram air fan comprising:
the ram air fan having one or more internal components that generate heat during operation; and
a shrouded particle separator in flow communication with the components of the ram air fan, the shrouded particle separator having a first housing with an open proximal end and a second housing having a portion disposed within the first housing, wherein the second housing has a plurality of passages therein, the passages are disposed within the first housing at a distance from the open proximal end thereof.

12. The assembly of claim 11, wherein the open proximal end of the first housing includes a bell-mouth and the first housing has a hollow tubular shape.

13. The assembly of claim 11, wherein the plurality of passages extend through a side surface of the second housing that is disposed within the first housing.

14. The assembly of claim 11, wherein the plurality of passages are disposed substantially 90 degrees to a direction of an air flow passing through the first housing such that air flow must change flow direction to pass through the plurality of passages and enter the second housing.

15. The assembly of claim 11, wherein the second housing has a closed proximal end disposed adjacent the open proximal end of the outer housing.

16. The assembly of claim 11, wherein a side surface of the second housing extends substantially parallel to a side wall of the first housing, and wherein the plurality of passages extend through the side surface of the second housing.

17. An environmental control system comprising:
one or more components that generate heat during operation;
a shrouded particle separator in flow communication with the one or more component, the shrouded particle separator having a first housing with an open proximal end and a second housing having a portion disposed within the first housing, wherein the second housing has a plurality of passages therein, the passages disposed within the first housing at a distance from the open proximal end thereof.

18. The environmental control system of claim 17, wherein the plurality of passages are disposed substantially 90 degrees to a direction of an air flow passing through the first housing such that air flow must change flow direction to pass through the plurality of passages and enter the second housing.

19. The environmental control system of claim 17, wherein the second housing has a closed proximal end disposed adjacent the open proximal end of the outer housing.

20. The environmental control system of claim 17, wherein a side surface of the second housing extends substantially parallel to a side wall of the first housing, and wherein the plurality of passages extend through the side surface of the second housing.

* * * * *